US010230674B2

(12) United States Patent
Chakra et al.

(10) Patent No.: US 10,230,674 B2
(45) Date of Patent: *Mar. 12, 2019

(54) VIRTUAL DISCUSSION THREADS FOR ACTIVITIES IN A TRUSTED NETWORK

(71) Applicant: INTERNATIONAL BUSINESS MACHINES CORPORATION, Armonk, NY (US)

(72) Inventors: Al Chakra, Apex, NC (US); Thomas Dolan, Athenry (IE); John Rice, Tramore (IE); Hamed Sako, Sutton (IE)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 99 days.

This patent is subject to a terminal disclaimer.

(21) Appl. No.: 15/133,524

(22) Filed: Apr. 20, 2016

(65) Prior Publication Data

US 2016/0234148 A1 Aug. 11, 2016

Related U.S. Application Data

(63) Continuation of application No. 13/605,042, filed on Sep. 6, 2012, now Pat. No. 9,342,821.

(51) Int. Cl.
*G06F 15/16* (2006.01)
*H04L 12/58* (2006.01)
(Continued)

(52) U.S. Cl.
CPC ........... *H04L 51/14* (2013.01); *G06Q 10/107* (2013.01); *H04L 51/043* (2013.01); *H04L 51/16* (2013.01); *H04L 51/24* (2013.01); *H04L 67/24* (2013.01)

(58) Field of Classification Search
CPC ................................ H04L 51/14; H04L 67/24
See application file for complete search history.

(56) References Cited

U.S. PATENT DOCUMENTS 7,197,561 B1 3/2007 Lovy et al.
7,237,009 B1\* 6/2007 Fung .................... G06Q 10/00
709/206

(Continued)

OTHER PUBLICATIONS

Tschabitscher, H., "How to View Mail Grouped by Conversation Thread in Windows Live Mail," [online] About.com Guide, Computing Email, retrieved from the Internet: <http://email.about.com/od/livemaildesktoptips/qt/View_Mail_Grouped_by_Conversation_Thread_in_Win_Live_Mail.htm>, viewed Aug. 29, 2012, 2 pgs.

(Continued)

*Primary Examiner* — Hua Fan
(74) *Attorney, Agent, or Firm* — Cuenot, Forsythe & Kim, LLC

(57) ABSTRACT

Managing discussion threads within an electronic communication system includes detecting that an electronic message sent from a sender to a first recipient is forwarded from the sender to a second recipient and, responsive to the detecting, identifying at least one electronic message related to the forwarded message exchanged between the sender and the second recipient as a virtual discussion thread. A client is notified of that the virtual discussion thread exists and is correlated with the electronic message from the sender. The virtual discussion thread is provided to the client of the first recipient.

20 Claims, 3 Drawing Sheets

(51) Int. Cl.
  *G06Q 10/10* (2012.01)
  *H04L 29/08* (2006.01)

(56) References Cited

U.S. PATENT DOCUMENTS

| | | | |
|---|---|---|---|
| 7,506,263 | B1 | 3/2009 | Johnston et al. |
| 7,818,385 | B2 | 10/2010 | Naick et al. |
| 7,822,820 | B2 | 10/2010 | Levasseur et al. |
| 2004/0044735 | A1 | 3/2004 | Hoblit |
| 2006/0085238 | A1* | 4/2006 | Oden ............... G06Q 10/06311 705/7.15 |
| 2007/0005706 | A1 | 1/2007 | Branda et al. |
| 2008/0222531 | A1 | 9/2008 | Davidson et al. |
| 2009/0063636 | A1 | 3/2009 | Heidloff et al. |
| 2009/0125596 | A1* | 5/2009 | Naick ................. G06Q 10/107 709/206 |
| 2009/0150197 | A1 | 6/2009 | Strauss |
| 2010/0057855 | A1 | 3/2010 | Chakra et al. |
| 2010/0076989 | A1 | 3/2010 | Jakobson |
| 2010/0146059 | A1* | 6/2010 | DellaFera ........... G06Q 10/107 709/206 |
| 2010/0169429 | A1 | 7/2010 | O'Sullivan et al. |
| 2010/0198927 | A1 | 8/2010 | Tonnison et al. |
| 2012/0213345 | A1 | 8/2012 | Agarwal |
| 2014/0067966 | A1 | 3/2014 | Chakra et al. |

OTHER PUBLICATIONS

Jive Community : Show whole discussion thread in email, [online] Jive Software, Jive Community, Jul. 1, 2010 through Mar. 24, 2011, retrieved from the Internet: <https://community.jivesoftware.com/thread/84868>, viewed Aug. 29, 2012, 12 pgs.

Chen, D., "Threaded email or not, now it's your users' choice in Gmail," [online] Google Inc., Official Google Enterprise Blog, Sep. 29, 2010, retreived from the Internet: <http://googleenterprise.blogspot.com/2010/09/threaded-email-or-not-now-its-your.html>, viewed Aug. 29, 2012, 10 pgs.

"View messages by conversation or thread," [online] Microsoft Office, Microsoft 2012, retrieved from the Internet: <http://office.microsoft.com/en-us/outlook-help/view-messages-by-conversation-or-thread-HA001135667.aspx>, viewed Aug. 29, 2012, 2 pgs.

"ParameterizedThreadStart Delegate," [online] Microsoft Developers Network Library, Microsoft 2012, retrieved from the Internet: <http://msdn.microsoft.com/en-us/library/system.threading.parameterizedthreadstart.aspx>, viewed Aug. 29, 2012, 3 pgs.

U.S. Appl. No. 13/605,042, Non-Final Office Action, dated Dec. 31, 2014, 9 pg.

U.S. Appl. No. 13/605,042, Final Office Action, dated Apr. 16, 2015, 13 pg.

U.S. Appl. No. 13/605,042, Notice of Allowance, dated Feb. 23, 2016, 10 pg.

\* cited by examiner

200

| Virtual Discussion Thread | |
|---|---|
| User C | I am also working on that issue. |
| User A | Any idea when the issue will be resolved? |
| User C | Done, just uploaded the fix. |

US 10,230,674 B2

VIRTUAL DISCUSSION THREADS FOR ACTIVITIES IN A TRUSTED NETWORK

BACKGROUND

Electronic messaging systems, such as electronic mail (email), are routinely used to share information among colleagues and friends. In some cases, the recipient of an electronic message is not available and/or able to immediately respond. For example, a sender may send an email message to a first recipient. The first recipient, however, may be out of the office or otherwise unavailable and unable to respond to the email message in a timely manner. In an attempt to obtain an answer to an issue raised within the email message, the sender may forward the email message to a second email recipient.

When the first recipient becomes available and reviews his or her inbox within the email application, the first recipient is likely presented with a large number of unopened emails to which no responses have been sent. Within that large number of emails will be the email from the sender. The first recipient is not aware of whether the issue raised in the email message was resolved or even that the email message was forwarded to another person.

BRIEF SUMMARY

An embodiment can include a method. The method includes detecting that an electronic message sent from a sender to a first recipient is forwarded from the sender to a second recipient using a processor and, responsive to the detecting, identifying at least one electronic message related to the forwarded message exchanged between the sender and the second recipient that is not addressed to the first recipient as a virtual discussion thread. A client of the first recipient is notified that the virtual discussion thread exists and is correlated with the electronic message from the sender. The virtual discussion thread is sent to the client of the first recipient.

Another embodiment can include a system. The system includes a processor that is configured to initiate executable operations. The executable operations include detecting that an electronic message sent from a sender to a first recipient is forwarded from the sender to a second recipient and, responsive to the detecting, identifying at least one electronic message, related to the forwarded message, exchanged between the sender and the second recipient that is not addressed to the first recipient as a virtual discussion thread. A client of the first recipient is notified that the virtual discussion thread exists and is correlated with the electronic message from the sender. The virtual discussion thread is sent to the client of the first recipient.

Another embodiment includes include a computer program product. The computer program product includes a computer-readable storage medium having stored thereon program code that, when executed, configures a processor to perform operations. The operations include detecting that an electronic message sent from a sender to a first recipient is forwarded from the sender to a second recipient and, responsive to the detecting, identifying at least one electronic message, related to the forwarded message, exchanged between the sender and the second recipient that is not addressed to the first recipient as a virtual discussion thread. A client of the first recipient is notified that the virtual discussion thread exists and is correlated with the electronic message from the sender. The virtual discussion thread is sent to the client of the first recipient.

DETAILED DESCRIPTION

Figure 1:
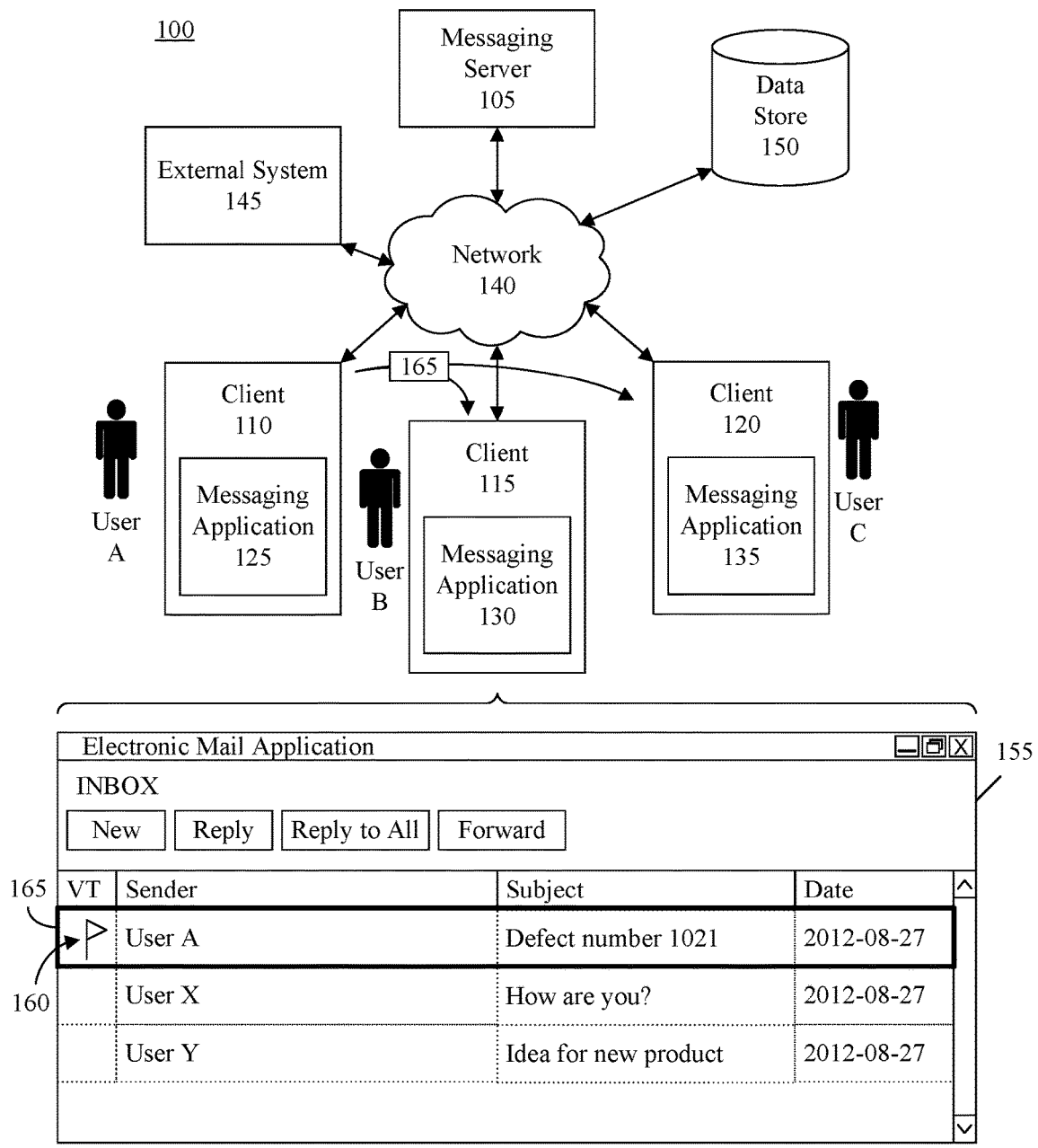
FIG. 1 is a block diagram illustrating an example of a communication system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing.

Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

One or more embodiments disclosed within this specification relate to electronic messaging systems. In accordance with the inventive arrangements disclosed herein, an electronic message that is sent to a first recipient that is subsequently forwarded to a second recipient can trigger the creation of a virtual discussion thread. The virtual discussion thread includes, or references, electronic messages that are exchanged between the sender and the second recipient despite the first recipient not being included within the exchange. As such, the electronic messages of the virtual discussion thread do not involve the first recipient. Though the first recipient is not involved in the ensuing exchange of electronic mails between the sender and the second recipient, the first recipient is informed of the exchange by making the existence of the virtual discussion thread and the virtual discussion thread itself available to the first recipient.

FIG. 1 is a block diagram illustrating an example of a communication system (system) 100. System 100 includes a messaging server 105 and one or more clients such as clients 110, 115, and 120. System 100 further can include a data store 150 and, optionally, an external system 145. Messaging server 105, clients 110, 115, and 120, external system 145, and data store 150 are communicatively linked through a network 140. Network 140 can be implemented as, or include, any of a variety of different networks such as a WAN, a LAN, a wireless network, a mobile network, a Virtual Private Network (VPN), the Internet, or the like.

A "messaging system" is characterized by the inclusion of a server (e.g., messaging server 105) and one or more clients (e.g., clients 110-120). The server and the clients each can be implemented as a data processing system executing suitable operational software. Referring to FIG. 1, messaging server 105 executes message processing software that configures the server to distribute electronic messages (messages) to one or more different users and perform the various operations described within this specification. Clients 110-120 execute client messaging applications 125-135, respectively, that allow clients 110-120 to interact with messaging server 105 to exchange messages and perform the operations described herein.

Examples of messaging systems can include, but are not limited to, electronic mail (email) systems, instant or text messaging systems, or the like. Thus, examples of messages can include emails, text messages, instant messages (e.g., Multimedia Messaging Service (MMS) messages)), or the like.

From time-to-time within this specification, reference to a client, such as any of clients 110-120, may also refer to, or reference, the particular user of that client. A "user" refers to a human being that operates or uses a particular data processing system such as one of clients 110-120. Similarly, reference to a user may also refer to, or reference, the client used by that user. In this regard, the term "sender" refers to a particular user, or client of a user, that is sending or has sent a message. A "recipient" refers to a particular user, or client of a user, that is receiving or has received a message sent from a sender.

As illustrated in FIG. 1, client 110 corresponds to, or is used by, user A. Client 115 corresponds to user B. Client 120 corresponds to user C. Thus, reference to a particular user also may refer to the particular client used by the referenced user. Thus, when it is stated that user A sends a message to user B, it is appreciated that user A initiates the sending of a message from client 110, via messaging server 105, to client 115, in which the message that is sent specifies an address associated with user B.

Data store 150 is configured to store social network data. It should be appreciated that while data store 150 is illustrated as being independent from messaging server 105, in another aspect, data store 150, or the information contained therein, can be integrated within, or as part of, messaging server 105. In any case, data store 150 can be implemented as a database or the like in which social network data is stored. The social network data stored within data store 150 specifies a structure among users, e.g., among users A, B, and C.

The social network data, for example, can indicate an organizational hierarchy of an entity, which user reports or is managed by which other user(s), expertise of a user, alternates and/or stand-ins for a user based upon expertise, teams or other subgroupings of users within the larger social network or the like. In general, the social network data stored in data store 150 indicates the relationships among users in the social network and whether one user is considered "trusted" or a trusted contact of another. Users connected by a defined and selected type of relationship within the social network (as defined by the social network data), for example, can be considered "trusted contacts" of one another.

In operation, client 110 (e.g., user A) can send a message 165 to client 115 (e.g., user B). In this example, user A is the sender and user B is the recipient, i.e., a first recipient. Messaging server 105 routes message 165 from user A to user B. As known, message 165 is provided from client 110 to messaging server 105. Message 165 is then obtained by client 115.

Consider an illustrative example in which user A requires assistance from user B to resolve an issue. Message 165 sent from user A to user B, in that case, will describe or reference the issue. In one aspect, message 165 includes a textual description of the issue that is to be resolved. In another aspect, message 165 includes a link, e.g., a hyperlink, to an issue that has been created and is maintained within a different system such as external system 145.

External system 145 also is implemented as a data processing system executing suitable operational software. External system 145 is independent of the messaging system. For example, in the case of software development, external system 145 can be a defect tracking system. External system 145, however, can represent any of a variety of systems that maintain records to which a link can be provided and/or to which a status can be associated. Accordingly, message 165 sent from user A to user B can include a link that, when selected, opens a browser and retrieves an electronic file and/or data describing the issue within external system 145. Still, as noted, external system 145 is optional in that message 165 can simply include a textual description of the issue to be resolved.

If user B is unavailable, user A may not receive a reply to message 165 from user B for some period of time, e.g., a minimum amount of time. In that case, user A may forward message 165 to user C. In this example, user C can be considered to be a trusted contact of user B within the social network of user B as defined by the social network data stored within data store 150.

In one aspect, messaging server 105 can be configured to detect that message 165 sent from user A to user B was forwarded to user C. Messaging server 105 also may detect other conditions such as user C being within the social network of user B, the passage of at least a minimum amount of time without user B responding to message 165, or the like.

In one aspect, the term "forwarding" refers to sending a copy of a previously sent message to a different user. For example, message 165 sent from user A to user B is forwarded to user C. A copy of the message sent to user B is sent to user C. It should be appreciated that in forwarding a message, additional material and/or content can be added to the forwarded message not in the original message.

In another aspect, forwarding can include user A sending a new message to user C that includes some and/or all of the content of the message sent from user A to user B. For example, user A can create a new message and copy or paste text from the message sent to user B into the new message to be sent to user C. In that case, messaging server 105 can detect the similarity or same text within both messages to determine that the message from user A to user B was forwarded from user A to user C.

Responsive to one or more of the aforementioned conditions, messaging server 105 can begin tracking messages exchanged between user A and user C from message 165 on. The messages exchanged between user A and user C, for example, in response to message 165 being forwarded to user C, are considered a virtual discussion thread that is stored in messaging server 105. In this example, the messages of the virtual discussion thread exchanged between user A and user C are not sent to, or distributed to, user B. For example, the various messages exchanged between user A and user C responsive to the forwarding of message 165 that are part of the virtual discussion thread do not specify an address for user B within a "to" field, a "cc" field, a "bcc" field, etc.

At some point in the future, the user B becomes available, but is unaware of the correspondence between user A and user C. In one aspect, messaging server 105 can notify client 115 and, more particularly, messaging application 130, of the existence of a virtual thread that has been created and which is correlated with message 165 as originally sent from user A to user B and for which no response was sent.

FIG. 1 also illustrates an exemplary graphical user interface (GUI) 155 that can be presented by client 115, e.g., rendered by messaging application 130. GUI 155 is an example of an inbox of messaging application 130. As such, GUI 155 presents a list of messages received by user B. Within the list, unopened messages can be distinguished from opened messages. Further, any message that is associated with a virtual discussion thread can be distinguished from messages not associated with a virtual discussion thread.

Within GUI 155, for example, the first listed message is message 165 from user A. An indicator 160 is provided that indicates that a virtual discussion thread exists for the message. It should be appreciated, however, that the association with message 165 and a virtual discussion thread can be indicated visually by any of a variety of different mechanisms such as color coding or the like. Thus, user B is alerted to the fact that further correspondence took place relating to message 165 by virtue of the association of message 165 with the virtual discussion thread. The presence of indicator 160, or any other indicator, further can alerts user B as to whether an issue raised by message 165 has been resolved and that a replay to the message may not be required.

Figures 2, 3:
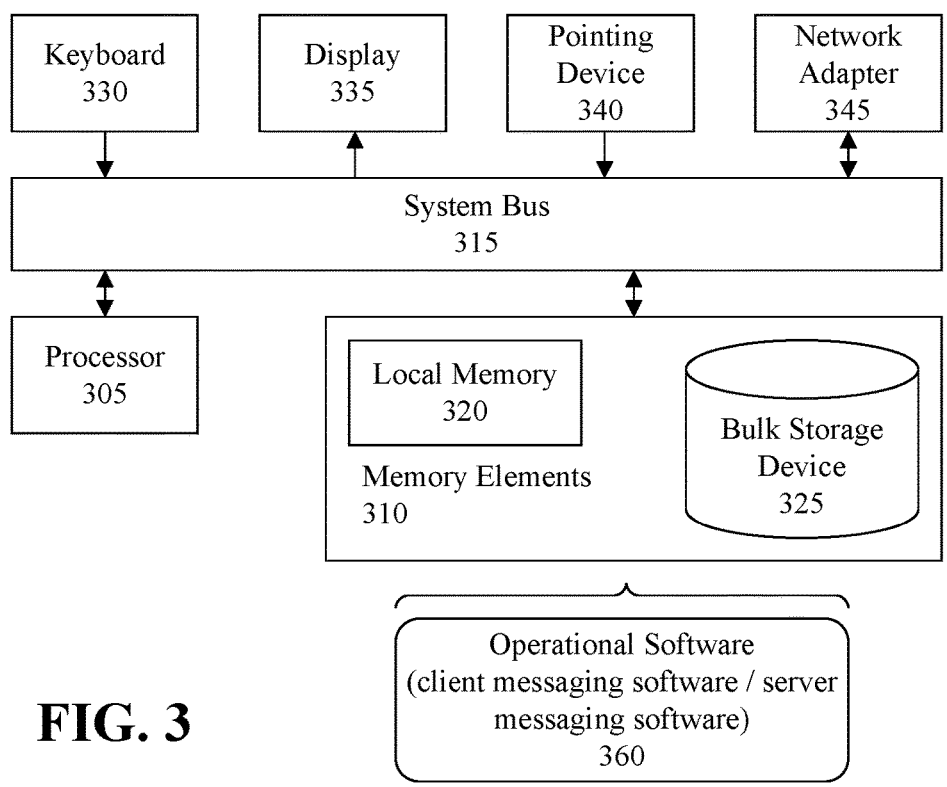
FIG. 2 is an example of a graphical user interface displaying a virtual discussion thread.
FIG. 3 is a block diagram illustrating an exemplary implementation of a data processing system.

FIG. 2 is an example of a GUI 200 displaying a virtual discussion thread. GUI 200 can be presented in response to a user selection of a message that is associated with a virtual discussion thread. "Selecting" a message includes the user providing an input that selects the message, the indicator associated with the virtual discussion thread, or the like. Examples of user inputs for selecting include clicking using a pointer, hovering over the message or the indicator for at least a minimum amount of time, etc. Referring to FIG. 1 for example, responsive to user B selecting message 165 or indicator 160, GUI 200 can be displayed. In one aspect, GUI 200 can be displayed above, e.g., superimposed over, GUI 155.

GUI 200 presents the virtual discussion thread, or a representation thereof, that is obtained from messaging server 105. As pictured within GUI 200, the virtual discussion thread includes three messages exchanged between user A and user C relating to the issue initially specified within the message sent from user A to user B. In this example, when user A forwards the message that was initially sent to user B to user C, messaging server 105 created a virtual discussion thread including the ensuing messages (response and/or reply messages) between user A and user C. GUI 200 provides a representation of the messages within the virtual discussion thread.

In one example, the virtual discussion thread includes some or all of the text of the messages as presented within GUI 200 along with the sender and, potentially, a recipient. For example, for each message, the first N characters or lines (where N is an integer number) of the body can be displayed, the subject can be displayed, or any combination thereof. In another example, a summary of the text of the messages can be displayed. Time information, e.g., the sending time, of a message optionally can be displayed as well.

FIG. 3 is a block diagram illustrating an exemplary implementation of a data processing system (system) 300. In one aspect, one or more of clients 110-120 of FIG. 1 are implemented as a data processing system using an architecture as described with reference to FIG. 3. While using the architecture of FIG. 1, it should be appreciated that clients 110-120 can be implemented in any of a variety of form factors such as personal computers, laptop computers, mobile communication devices, tablets, or the like. Messaging server 105 also is implemented as a data processing system using an architecture as described with reference to FIG. 3.

System 300 can include at least one processor 305 coupled to memory elements 310 through a system bus 315 or other suitable circuitry. As such, system 300 can store program code within memory elements 310. Processor 305 can execute the program code accessed from memory elements 310 via system bus 315. In one aspect, for example, system 300 can be implemented as a computer that is suitable for storing and/or executing program code. It should be appreciated, however, that system 300 can be implemented in the form of any system including a processor and memory that is capable of performing the functions and/or operations described within this specification.

Memory elements 310 can include one or more physical memory devices such as, for example, local memory 320 and one or more bulk storage devices 325. Local memory 320 refers to RAM or other non-persistent memory device(s) generally used during actual execution of the program code. Bulk storage device(s) 325 can be implemented as a hard disk drive (HDD), solid state drive (SSD), or other persistent data storage device. System 300 also can include one or more cache memories (not shown) that provide temporary storage of at least some program code in order to reduce the number of times program code must be retrieved from bulk storage device 325 during execution.

Input/output (I/O) devices such as a keyboard 330, a display 335, and a pointing device 340 optionally can be coupled to system 300. The I/O devices can be coupled to system 300 either directly or through intervening I/O controllers. One or more network adapters 345 also can be coupled to system 300 to enable system 300 to become coupled to other systems, computer systems, remote printers, and/or remote storage devices through intervening private or public networks. Modems, cable modems, and Ethernet cards are examples of different types of network adapters 345 that can be used with system 300.

As pictured in FIG. 3, memory elements 310 can store operational software 305. Operational software 305, being implemented in the form of program code, can be executed by system 300 and, as such, can be considered part of system 300. As discussed, each of the clients of FIG. 1 and the messaging server can be implemented as a data processing system as described with reference to FIG. 3 executing suitable operational software 360 such as a client messaging application in the case of a client or a server messaging application in the case of a messaging server.

Figure 4:
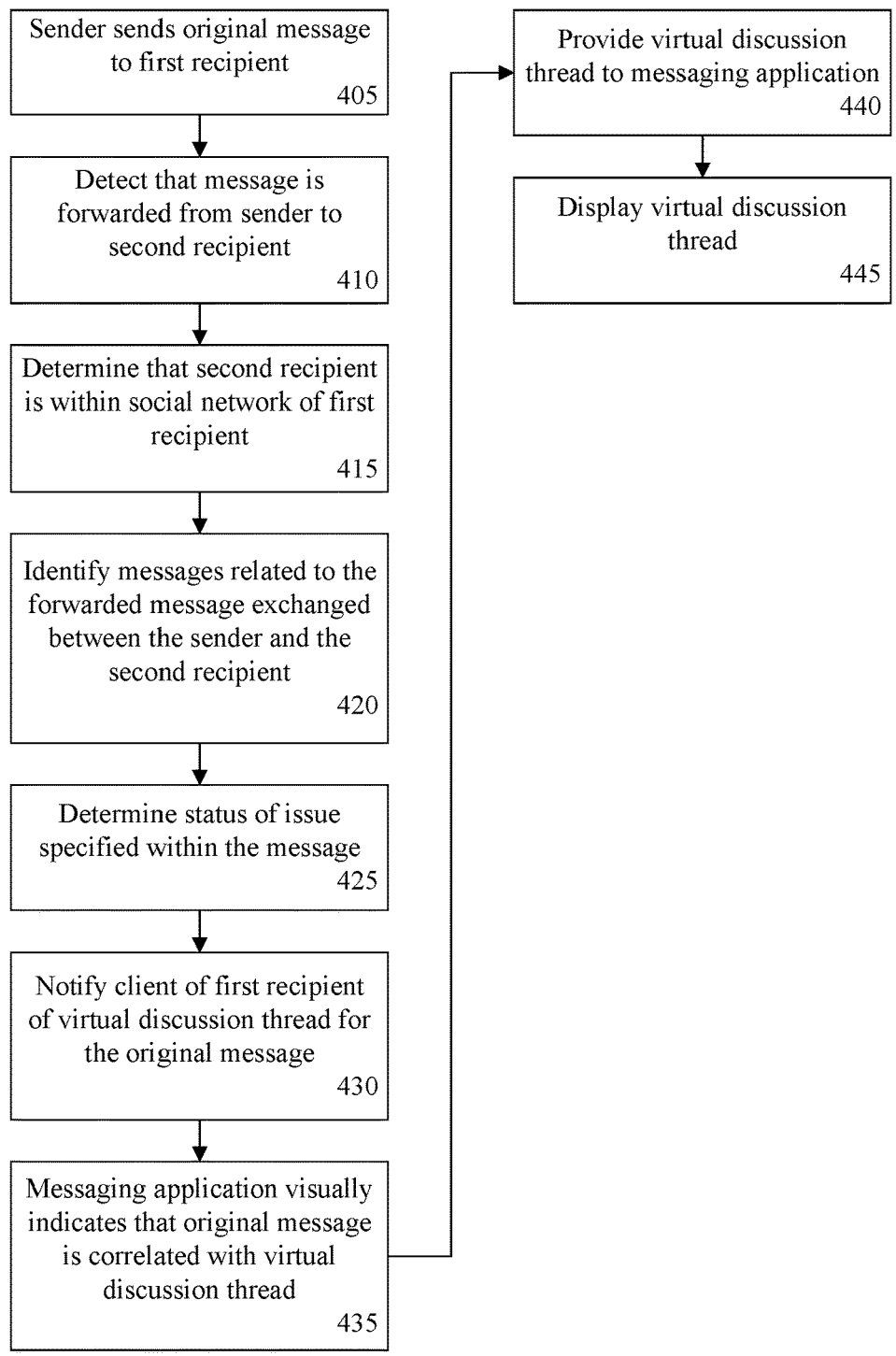
FIG. 4 is a flow chart illustrating an exemplary method of managing virtual discussion threads.

FIG. 4 is a flow chart illustrating an exemplary method 400 of managing virtual discussion threads. Method 400 can be implemented by a system such as the system illustrated and described with reference to FIGS. 1-3 of this specification.

In block 405, the sender sends a message to a first recipient. For illustrative purposes, the message sent from the sender to the first recipient may be referred to from time-to-time as the "original message." The message is sent by way of the messaging server. In block 410, the messaging server detects that the message has been forwarded from the sender to a second recipient. The message that is forwarded from the sender to the second recipient may be referred to from time-to-time as "the forwarded message." For example, the messaging server also determines that the first recipient was not listed as an addressee in the forwarded message and, as such, would have no knowledge that the original message was forwarded to the second recipient.

In some cases, the sender will wait for at least a predetermined period of time prior to forwarding the message to the second recipient. In another aspect, the messaging server can identify the forwarded message only after some predetermined minimum amount of time after the sending of the original message and during which the first recipient does not reply to the original message. In still another aspect, the messaging server can monitor for forwarding of a message responsive to detecting an "out of office" reply from the first recipient.

In one aspect, the identification of a forwarded message by the messaging server also can be predicated upon the detection of an issue raised within the forwarded and/or original message. For example, the messaging server can be configured to detect a link as described within a message and require the existence of such a link to create a virtual discussion thread. In another example, a sender explicitly opt into virtual discussion thread processing by activating a control to set an opt in parameter on the message. In another aspect, the messaging server can detect particular words utilized in a message that initiate virtual discussion thread processing. In still another example, discussion thread processing can be triggered for a forwarded message in which a high priority has been assigned to the message.

Similarly, users may opt out of virtual discussion thread processing. Such opt out can be manually specified by the sender by activating an opt out parameter. In another example, the detection of information of a confidential nature, e.g., salary, raises, etc. or particular key words within a message by the messaging server can opt the message out of virtual discussion thread processing (e.g., deactivate discussion thread processing for a message).

Continuing with method 400, in block 415, the messaging server determines whether the second recipient is within a social network of the first recipient and, more particularly, a trusted contact within the social network of the first recipient. As noted, the messaging server can access a data store that stores social network data to determine whether the first recipient and the second recipient have a defined relationship with one another such as one being a "trusted contact" of the other. Examples of trusted contacts include, but are not limited to, the second recipient being a backup for the first recipient, both recipients having same subject matter expertise within an (i.e., a same) organization, both recipients being within a same subgroup of an organization such as a design team, or the like. Each of the aforementioned examples is illustrative of the second recipient being a trusted contact within the social network of the first recipient.

In block 420, the messaging server identifies any messages that are exchanged between the sender and the second recipient that are related to the forwarded message. For example, the messaging server identifies any reply to the forwarded message by the second recipient to the sender, and subsequent reply from the sender back to the second recipient, etc. The messages identified in block 420 by the messaging server form a virtual discussion thread in that the messages do not involve, and are not directed to, the first recipient. In one embodiment, the virtual discussion thread includes the forwarded messaged. In another embodiment, the virtual discussion thread does not include the forwarded message.

In block 425, the messaging server, optionally, determines a status of an issue raised within the virtual discussion thread (e.g., by the original message sent to the first recipient). Performance of block 425 is predicated upon the identification of an issue raised by the original message and/or the forwarded message through any of the techniques described, e.g., text processing, detecting a link, or the like.

In one aspect, the messaging server can identify a link to an external system within the original message, the forwarded message, and/or any message that is identified as part of the virtual discussion thread. The messaging server can follow the link and determine a status from the external system.

In another aspect, the messaging server can analyze the text of the original message, the forwarded message, and/or any messages of the virtual discussion thread to determine the status of an issue. For example, the messaging server can locate instances of words such as "open," "unresolved," "resolved," "done," "fixed," or the like as indicating whether the issue is still open or has been fixed or closed.

In still another aspect, users such as the sender and/or the second recipient can access a control via the messaging application to flag or set an indicator of the status of the issue. An control such as a check box or other flag can be included in the messages exchanged as part of the virtual discussion thread and/or within the messaging application, for example. The control allows the sender or the second recipient to mark the issue resolved or leave the issue open according to the state of the control.

In block 430, the messaging server notifies the client of the first recipient (e.g., the messaging application for the first recipient) of the existence of the virtual discussion thread and that the virtual discussion thread is correlated with, or is for, the original message. In block 435, the messaging application (or client) of the first recipient visually indicates that the original message is correlated with a virtual discussion thread. For example, when the first recipient is available or accesses the message list within the inbox of the messaging application, the first recipient is able to see that the message from the sender is associated with the virtual discussion thread.

In another aspect, the manner in which the message associated with the virtual discussion thread is visually distinguished can indicate the status of the issue raised by the original message, the forwarded message, and/or the virtual discussion thread. For example, color coding or different visual indicators can be used to distinguish whether the issue is still open or has been resolved. Thus, the first recipient can determine, without opening the message, that the message is associated with a virtual discussion thread and (optionally) whether the issue raised by the original message has been resolved. Accordingly, the first recipient can choose to view the message, view the virtual discussion thread, delete the message without actually opening or having to read the message, or take some other action.

In block 440, the messaging server provides the virtual discussion thread, or data specifying a representation of the virtual discussion thread, to the messaging application of the first recipient. In one example, the virtual discussion thread can be provided to the messaging application with the notification of the existence of the virtual discussion thread or shortly thereafter. In another aspect, the virtual discussion thread can be sent to the client of the first recipient responsive to the first recipient selecting an indicator of the virtual discussion thread, the original message, or another control.

In block 445, the messaging application of the first recipient can display the virtual discussion thread. For example, responsive to the first recipient selecting a control, e.g., the indicator of the virtual discussion thread or the original message, the virtual discussion thread can be displayed.

It should be appreciated that the messaging server can be configured to update the status of the issue related to the virtual discussion thread from time-to-time, periodically, or responsive to detecting a resolution. Accordingly, the messaging server can send an updated status to the client of the first recipient which then can modify the visual indicator used for the original message to correctly indicate the current status.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A computer-implemented method within a server system, comprising:
    first sending, to a first recipient, an electronic message by a sender;
    second sending, to a second recipient and after the first sending, a forwarded electronic message;
    detecting that the forwarded electronic message to the second recipient is a forwarded version of the electronic message to the first recipient;
    determining, after the detecting, that the first recipient has a defined relationship with the second recipient;
    identifying, responsive to the detecting and the determining, as a virtual discussion thread at least one additional electronic message related to the forwarded electronic message, exchanged between the sender and the second recipient, that is not addressed to the first recipient;
    third sending, to the first recipient, a notification that
        (i) the virtual discussion thread exists and
        (ii) the virtual thread is correlated with the electronic message from the sender; and
    fourth sending the virtual discussion thread to the first recipient.

2. The method of claim 1, wherein
the identifying is performed responsive to a determination that the first recipient has a status of unavailable.

3. The method of claim 1, wherein
the defined relationship is that the second recipient is a trusted contact of the first recipient within a social network.

4. The method of claim 1, wherein
the defined relationship is found within social network data stored in a data store, and
the social network data specifies a structure among users.

5. The method of claim 1, wherein
a determination is made as to a status of an issue referenced within the electronic message.

6. The method of claim 5, wherein
the status of the issue is determined by accessing an link to an external system and found within the electronic message.

7. The method of claim 5, wherein
a messaging application associated with the first user is configured to visually indicate the status of the issue.

8. The method of claim 1, wherein
a messaging application associated with the first user is configured to visually indicate that the electronic message is correlated with the virtual discussion thread.

9. A computer hardware server system, comprising:
a hardware processor configured to initiate the following executable operations:
    first sending, to a first recipient, an electronic message by a sender;
    second sending, to a second recipient and after the first sending, a forwarded electronic message;
    detecting that the forwarded electronic message to the second recipient is a forwarded version of the electronic message to the first recipient;
    determining, after the detecting, that the first recipient has a defined relationship with the second recipient;
    identifying, responsive to the detecting and the determining, as a virtual discussion thread at least one additional electronic message related to the forwarded electronic message, exchanged between the sender and the second recipient, that is not addressed to the first recipient;
    third sending, to the first recipient, a notification that
        (i) the virtual discussion thread exists and
        (ii) the virtual thread is correlated with the electronic message from the sender; and
    fourth sending the virtual discussion thread to the first recipient.

10. The system of claim 9, wherein
the identifying is performed responsive to a determination that the first recipient has a status of unavailable.

11. The system of claim 9, wherein
the defined relationship is that the second recipient is a trusted contact of the first recipient within a social network.

12. The system of claim 9, wherein
the defined relationship is found within social network data stored in a data store, and
the social network data specifies a structure among users.

13. The system of claim 9, wherein
a determination is made as to a status of an issue referenced within the electronic message.

14. The system of claim 13, wherein
the status of the issue is determined by accessing an link to an external system and found within the electronic message.

15. The system of claim 13, wherein
a messaging application associated with the first user is configured to visually indicate the status of the issue.

16. The system of claim 9, wherein
a messaging application associated with the first user is configured to visually indicate that the electronic message is correlated with the virtual discussion thread.

17. A computer program product, comprising:
a hardware storage device having stored thereon program code that, when executed by a computer hardware server system, configures the computer hardware server system to perform:
  first sending, to a first recipient, an electronic message by a sender;
  second sending, to a second recipient and after the first sending, a forwarded electronic message;
  detecting that the forwarded electronic message to the second recipient is a forwarded version of the electronic message to the first recipient;
  determining, after the detecting, that the first recipient has a defined relationship with the second recipient;
  identifying, responsive to the detecting and the determining, as a virtual discussion thread at least one additional electronic message related to the forwarded electronic message, exchanged between the sender and the second recipient, that is not addressed to the first recipient;
  third sending, to the first recipient, a notification that
    (i) the virtual discussion thread exists and
    (ii) the virtual thread is correlated with the electronic message from the sender; and
  fourth sending the virtual discussion thread to the first recipient.

18. The computer program product of claim 17, wherein
the defined relationship is that the second recipient is a trusted contact of the first recipient within a social network,
the defined relationship is found within social network data stored in a data store, and
the social network data specifies a structure among users.

19. The computer program product of claim 17, wherein
a determination is made as to a status of an issue referenced within the electronic message,
the status of the issue is determined by accessing an link to an external system and found within the electronic message, and
a messaging application associated with the first user is configured to visually indicate the status of the issue.

20. The computer program product of claim 17, wherein
a messaging application associated with the first user is configured to visually indicate that the electronic message is correlated with the virtual discussion thread.

\* \* \* \* \*